United States Patent
Hossain et al.

(10) Patent No.: US 7,395,046 B2
(45) Date of Patent: Jul. 1, 2008

(54) METHOD AND APPARATUS FOR A MOBILE STATION TO ENHANCE THE PROBABILITY OF SUCCESSFUL EMERGENCY CALL COMPLETION AND SUCCESSFUL CALLBACK FROM EMERGENCY SERVICE CENTRE

(75) Inventors: Asif Hossain, Kanata (CA); M. Khaledul Islam, Kanata (CA); T. L. Trevor Plestid, Ottawa (CA)

(73) Assignee: Research In Motion Limited, Waterloo, ON (CA)

( * ) Notice: Subject to any disclaimer, the term of this patent is extended or adjusted under 35 U.S.C. 154(b) by 188 days.

(21) Appl. No.: 10/762,007

(22) Filed: Jan. 21, 2004

(65) Prior Publication Data

US 2004/0242191 A1 Dec. 2, 2004

Related U.S. Application Data

(60) Provisional application No. 60/441,504, filed on Jan. 21, 2003.

(51) Int. Cl.
 H04M 11/04 (2006.01)
 H04M 3/42 (2006.01)
 H04Q 7/22 (2006.01)
 H04Q 7/38 (2006.01)
 H04Q 7/20 (2006.01)
 H04B 7/00 (2006.01)
 G08B 29/00 (2006.01)

(52) U.S. Cl. .................. 455/404.1; 455/404.2; 455/445; 455/414.1; 455/521; 340/506

(58) Field of Classification Search .............. 455/404.1, 455/404.2, 521, 515, 456, 434, 403, 445, 455/414.1; 340/287–309, 506; 379/37–51
See application file for complete search history.

(56) References Cited

U.S. PATENT DOCUMENTS 6,690,940 B1 * 2/2004 Brown et al. ............. 455/456.4

(Continued)

FOREIGN PATENT DOCUMENTS

DE 100 50 744 A1 4/2001

(Continued)

OTHER PUBLICATIONS

Federal Communications Commission (FCC): "Revision of the Commission's Rules to Ensure Compatibility with Enhanced 911 Emergency Calling Systems," FCC Docket No. 94-102, 'Online! May 13, 1999, pp. 1-24, XP002280299.

(Continued)

*Primary Examiner*—Lester G. Kincaid
*Assistant Examiner*—Nathan Mitchell
(74) *Attorney, Agent, or Firm*—Moffat & Co.

(57) ABSTRACT

A method and apparatus for enhancing the probability of a successful emergency call completion and emergency callback on a mobile station in a network, the method comprising the steps of: during an emergency call attempt, monitoring whether the mobile station has received a non-voice service request from the network and, if yes, ignoring the non-voice service request. Further, during a callback period, monitoring whether the mobile station has received a service request from the network and, if yes, ignoring the service request if the service request is a non-voice service request that is anything but a position location service request. Further, during a callback period, monitoring whether a user attempts to initiate a non-voice service request that is anything but a position location service request, and if yes ignoring the non-voice service request.

14 Claims, 5 Drawing Sheets

U.S. PATENT DOCUMENTS

| | | |
|---|---|---|
| 2002/0077075 A1 * | 6/2002 | Ikonen et al. .............. 455/456 |
| 2002/0107032 A1 * | 8/2002 | Agness et al. .............. 455/456 |
| 2004/0032932 A1 * | 2/2004 | Kucmerowski et al. ....... 379/45 |
| 2004/0203572 A1 * | 10/2004 | Aerrabotu et al. ........ 455/404.1 |

FOREIGN PATENT DOCUMENTS

| | | | |
|---|---|---|---|
| JP | 2001-309427 | * | 2/2001 |
| WO | WO 94/28687 | | 12/1994 |
| WO | WO 9428687 | * | 12/1994 |

OTHER PUBLICATIONS

PCT/CA2004/000088 International Search Report (May 24, 2004) 5 pgs.

* cited by examiner

METHOD AND APPARATUS FOR A MOBILE STATION TO ENHANCE THE PROBABILITY OF SUCCESSFUL EMERGENCY CALL COMPLETION AND SUCCESSFUL CALLBACK FROM EMERGENCY SERVICE CENTRE

CROSS REFERENCE TO RELATED APPLICATION

The present application claims priority from U.S. provisional application Ser. No. 60/441,504 filed on Jan. 21, 2003, the complete drawings and specification of which are incorporated herein by reference.

FIELD OF THE INVENTION

This application relates to mobile communication techniques in general, and to a method and apparatus for a mobile station to enhance the probability of successful emergency call completion and successful callback from emergency service centre in particular.

BACKGROUND TO THE INVENTION

A regulatory body having a jurisdiction over classes of mobile communication systems imposes the requirement of an emergency service. For instance the Federal Communications Commission's (FCC's) orders docket 94-102 for Wireless E911 service, an exemplary emergency service, both in spirit and by order, intends that wireless subscribers, with a high probability of success, can:

Perform timely call completions for emergency calls;
Initiate emergency calls on any available wireless system;
Receive emergency callback service for a specific time duration, once the emergency call serving network is aware of the subscribers callback number; and
Be provided with clear notification of outgoing emergency calls.

Although regulatory bodies differ in jurisdiction and class of mobile communication systems, all communication systems would benefit from the enhanced probability of successfully completing a call to emergency services.

SUMMARY OF THE INVENTION

The details of a method and apparatus for a mobile station to enhance the probability of successful emergency call completion and successful callback from emergency service centre disclosed herein enable mobile stations (MSs) to enhance the probability of successful emergency call completion and successful callback from an emergency service centre.

A particular area of emergency services that is an object of the present application is the handling of network-initiated events that may otherwise interfere with emergency call handling and/or emergency callback service. Examples are network-initiated short message service (SMS) or push packet data service. Special handling of these cases significantly increases the probability of success for emergency services.

A typical implementation of emergency call handling is such that the Mobile Station (MS) may be allowed to acquire or camp on any system regardless of whether the system is preferred or not—even if SIM (Subscriber Identity Module) or RUIM (Removable User Identity Module) is not present. After the emergency call ends, the MS may stay on the last serving system for certain duration, which is known as the callback period. In one embodiment the MS may stay on the last serving system for approximately 5 minutes. One skilled in the art will realize that other durations are possible or may be more desirable. The user may be visually notified of the callback mode. The purpose of the callback mode is to ensure that the MS stays on the last system so that emergency service centre (e.g. Public Safety Answering Point or PSAP) can call back the user.

During the emergency call origination attempts, the MS may receive requests from the network to set-up other services. If the MS accepts such requests, the emergency call attempts may get terminated. If the wireless network receives the emergency call attempt, then the only requirement for the network may be to grant it highest priority in its queue so that it can be serviced with utmost priority. However, the network may not keep any information about the MS after the emergency call ends. As a result, it may initiate a non-urgent non-voice service during the callback period. If that happens and the MS accepts the service, the emergency call centre may not be able to call the MS during such sessions It is an object of the present application that a method and apparatus for a mobile station to enhance the probability of successful emergency call completion and successful callback from emergency service centre is provided at a MS to enable the MS to make intelligent decisions as to when it can reject non-emergency-voice services, as well as to when to accept all services without dropping emergency voice services.

The present invention therefore provides a method of enhancing the probability of a successful emergency call completion on a mobile station in a network, comprising the steps of: during an emergency call attempt by a mobile station, monitoring whether the mobile station has received a non-voice service request from the network and, if yes, ignoring said non-voice service request, said step of ignoring said non-voice service request includes blocking sending of an acknowledgement message generated by the mobile station based on said non-voice service request.

The present invention further provides a method of enhancing the probability of a successful emergency callback to a mobile station in a network from an emergency service centre, the method comprising the steps of: during a callback period, monitoring whether the mobile station has received a service request from the network and, if yes, ignoring said service request if said service request is a non-voice service request that is anything but a position location service request, said step of ignoring said service request includes blocking sending of an acknowledgement message generated by the mobile station based on said non-voice service request.

The present invention still further provides a method of enhancing the probability of a successful emergency callback to a mobile station in a network from an emergency service centre, the method comprising the step of: during a callback period, monitoring whether a user attempts to initiate a non-voice service request that is anything but a position location service request, and if yes ignoring said non-voice service request.

The present invention yet further provides a mobile station for enhancing the probability of successful emergency call completion to a network and successful callback from emergency service centre, the mobile station comprising: a communications subsystem, said communications subsystem including a receiver, a transmitter and a digital signal processor; a microprocessor communicating with said digital signal processor of said communications subsystem; user input and output means communicating with said microprocessor; memory communicating with said microprocessor; and an emergency service module, said emergency service module communicating with both said digital signal processor and said microprocessor, wherein during an emergency call attempt or callback said emergency service module directs said microprocessor to ignore non-voice service requests other than position location service requests from said network, the ignoring of the non-voice service requests including blocking sending of an acknowledgement message generated by the mobile station based on said non-voice service request.

Other aspects and features of the present application will become apparent to those ordinarily skilled in the art upon review of the following description of specific embodiments of a method and apparatus for a mobile station to enhance the probability of successful emergency call completion and successful callback from emergency service centre in conjunction with the accompanying figures.

BRIEF DESCRIPTION OF THE DRAWINGS

Embodiments of the present invention will now be described, by way of example only, with reference to the attached figures, wherein.

Same reference numerals are used in different figures to denote similar elements.

DETAILED DESCRIPTION OF THE DRAWINGS

Figure 1:
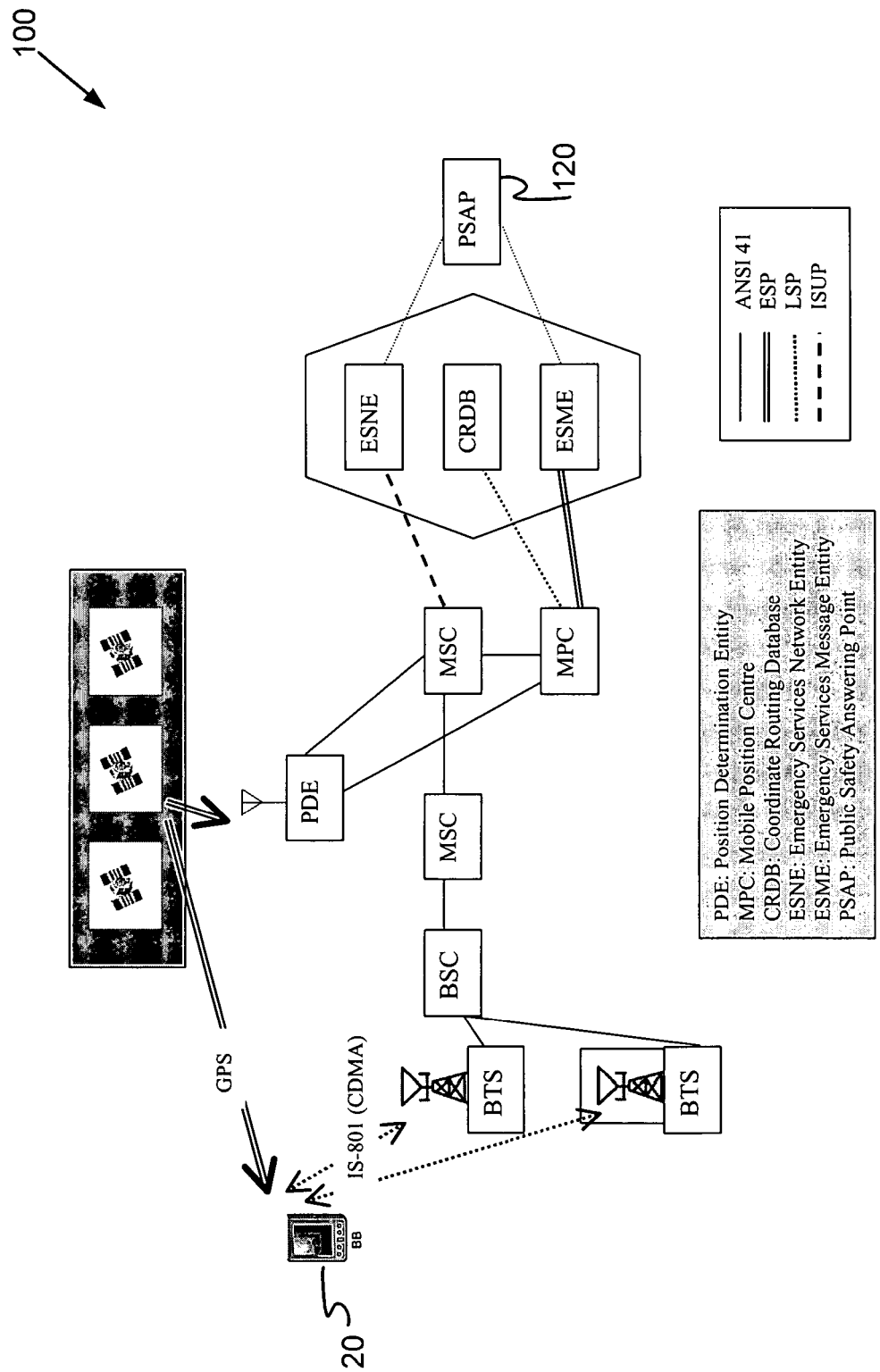
FIG. 1 is a block diagram illustrating an example CDMA network.

Referring to the drawings, FIG. 1 is a block diagram illustrating an example CDMA network 100. The following blocks are shown in FIG. 1:

MS 20: Mobile Station;
PDE: Position Determination Entity;
MPC: Mobile Position Centre;
CRDB: Coordinate Routing Database;
ESNE: Emergency Services Network Entity;
ESME: Emergency Services Message Entity; and
PSAP 120: Public Safety Answering Point.

The above blocks are known to those skilled in the art and with the exception of the mobile station will not be outlined in detail below.

When the user places an emergency call, the MS ignores any network-initiated mobile-terminated non-voice services. Any page from the network to establish such services is ignored for the duration of ongoing emergency call set-up attempts unless and until the user manually terminates emergency call attempts. Examples of non-voice services include Data, Short Message Service (SMS), Over-The-Air Parameter Administration (OTAPA) etc. This enhances the probability of successful emergency call origination since the MS ensures that emergency call origination process is not disrupted by network-initiated non-voice services.

When the MS is in emergency callback mode, it prevents the user from initiating any non-voice services except position location services. In addition, the MS refrains from making any autonomous user-invisible MS-initiated non-voice services. One example of such services is initiation of an autonomous data session for a variety of reasons such as reconnection or maintenance of data connectivity on an "always on always connected" data-capable MS. Stopping these services from being originated from the MS enhances the probability that the emergency call centre can successfully call the user during callback period. This is quite important when the MS has locked onto a less preferred wireless system. Any non-emergency call attempts in such condition will force the MS to exit the system and thereby making the MS unreachable from the emergency call centre.

When the MS is in emergency callback mode, the mobile station ignores any network-initiated non-voice services except network-initiated position location services. Ignoring these network-initiated services from being established during this period enhances the probability that the emergency call centre can successfully call the user during callback period.

If there is a page match (or any equivalent mechanism indicating that the network wants to communicate with the MS) and the proposed service option indicates one of the above mentioned services during callback period, MS simply fakes that it did not receive the page or indication from the network and does not send any response back to the network during the Emergency Call attempt period and the Emergency Call Back Mode period. With this mechanism, without any assistance from the network, the mobile device makes certain that any emergency call attempt or any mobile terminated call from the Emergency Services will be uninterrupted by any non voice call attempts. Other means of non voice call ignore could have been undertaken such as non voice call reject message to the network but that would require additional changes in the network side to handle such scenario.

If the MS receives any form of acknowledgement from the network in response to its emergency call attempt but the traffic channel set-up fails due to fading or any other reasons, the MS still enters callback mode and provides visual callback display to the user. In such case, emergency callback centre can still retrieve the mobile's callback number from its origination attempt and place a call to the MS.

If the mobile is already in some form of communication with the network such as in autonomous data session to maintain connectivity or in over the air service provisioning etc., an attempt by the user to make an emergency call will immediately end any previous session and the emergency call session will proceed. As the previous call session has just ended, the mobile device will try to acquire this system for the emergency call. Under the circumstances of mobile device failing to acquire this system, the device will try to acquire other systems, i.e., channels, which the mobile is allowed to acquire. In order to increase the probability of system acquisition, within the scan of other allowed systems, the mobile device will try to acquire the first system every 3 seconds or for a time period similar to that order. In this way, the probability of successful emergency call will be increased under the circumstances when an ongoing session with the network has been interrupted in order to provide a user a service for emergency call attempt. If the mobile device fails to acquire any system that it is allowed to acquire (regardless of whether it is preferred or not), it will attempt to acquire any other system on the frequency bands supported by it.

Figure 2:
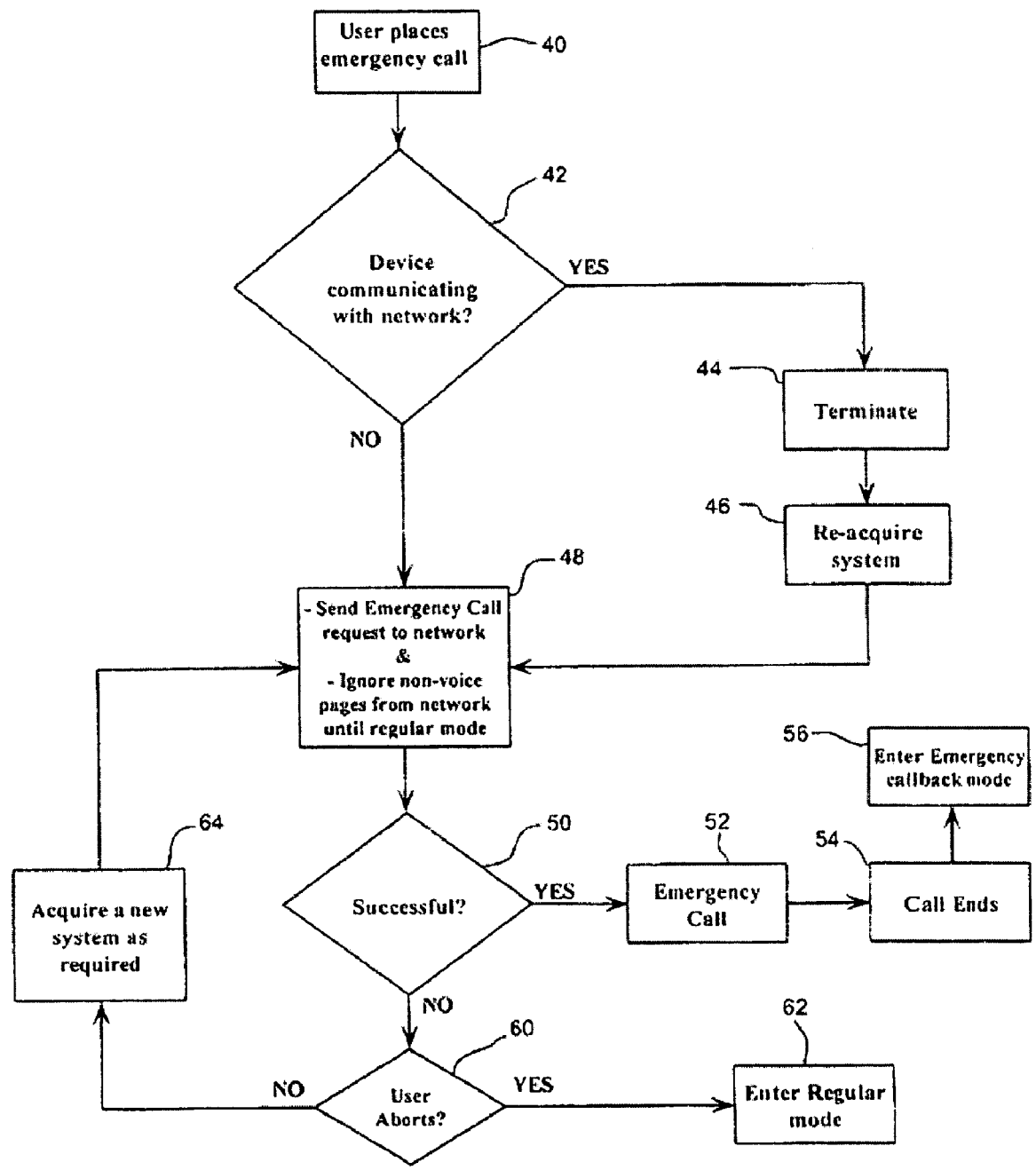
FIG. 2 is a flow chart of an emergency call attempt according to the method of the present invention.

Reference is now made to FIG. 2 regarding one way of implementing the above as illustrated. A user places an emergency call in step 40 and the mobile station 20 moves to step 42. In step 42, the mobile station 20 checks whether the device is already communicating with the network. If so, the mobile station moves to step 44 in which the communication with the network is terminated and to step 46 in which mobile device 20 tries to reacquire a system for the emergency call.

If in step 42 the device is not communicating with the network, or if the device is communicating and moves through steps 44 and 46, the mobile system next moves to step 48. In step 48 the mobile device sends an emergency call request to the network and it further ignores any non-voice pages from the network until a regular mode is entered.

Mobile station 20 next moves to step 50 in which it checks whether the network call request was successful. If yes, mobile station 20 moves to step 52 in which an emergency call is placed and once the emergency call is finished, the mobile station 20 moves to step 54 in which the call is ended. Mobile station 20 next moves to step 56 in which emergency callback mode is entered.

As one skilled in the art will appreciate, the emergency callback mode allows the device to be contacted by the emergency services network entity and ensure that the call will be uninterrupted by any non-voice call attempts.

If in step 50 the emergency call request to the network was unsuccessful, the system next moves to step 60. In step 60 the mobile station 20 checks whether the reason that the call was unsuccessful was because the user aborted the call. If the user aborted the call, the mobile station moves to step 62 in which the mobile station 20 moves into a regular mode.

Conversely, if the user did not abort in step 60, this mobile station 20 moves to step 64 in which it continues to try to acquire a new system as required and, based on this, further moves back to step 48.

Thus the mobile station will continue to attempt to acquire a network for the emergency call until either it has successfully completed the emergency call and ended in which case it will move into an emergency callback mode or, in the case of the user aborting the emergency call attempt, in which case the mobile station 20 enters a regular mode.

Figure 3:
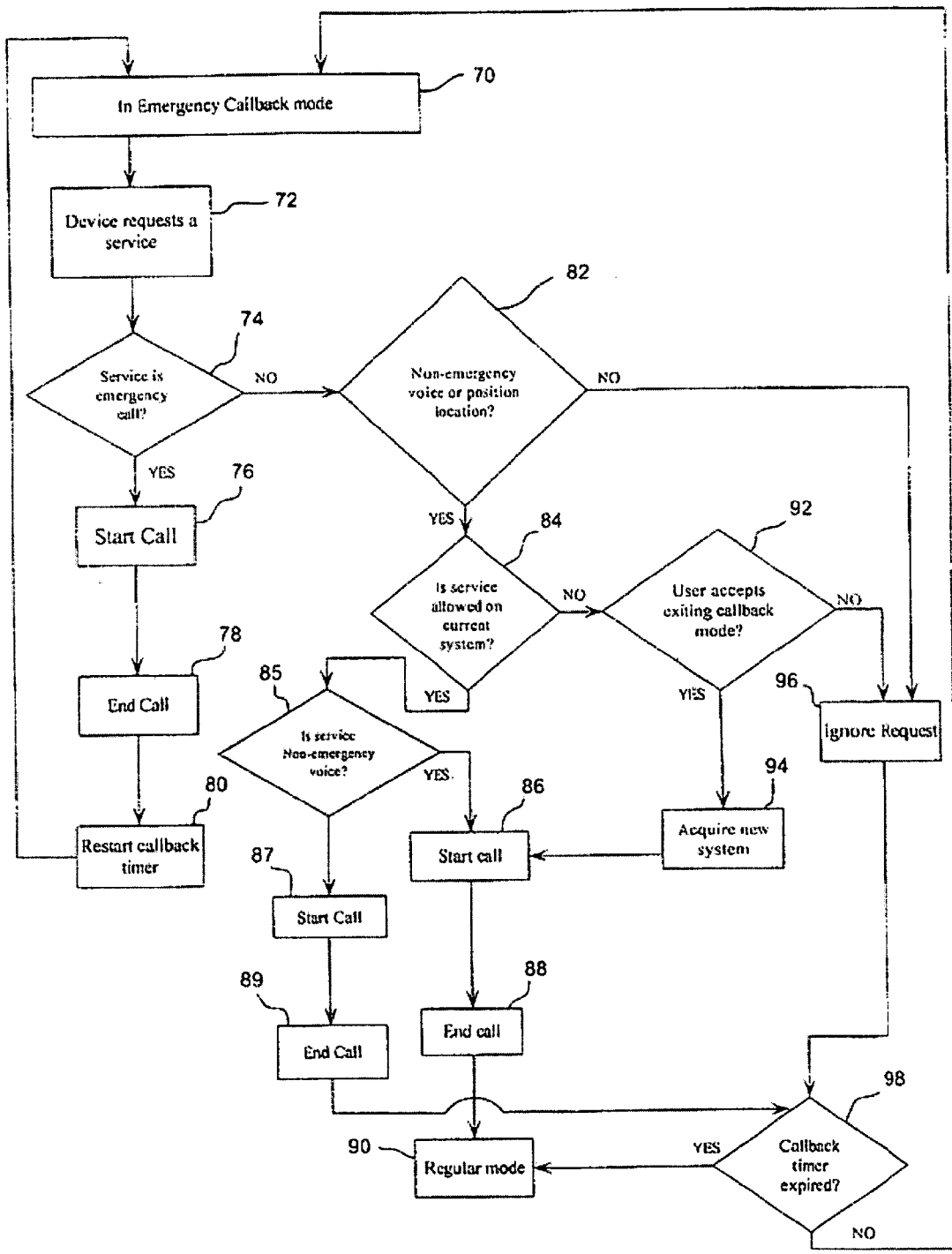
FIG. 3 is a flow chart of device initiated calls during emergency callback mode according to the method of the present invention.

Reference is now made to FIG. 3. Once the mobile station 20 moves into an emergency callback mode 70, a user may attempt to initiate calls during this callback mode. In step 72 the mobile device requests a service and the mobile station 20 moves to step 74. In step 74 the mobile station 20 checks whether the service is an emergency call. If it is an emergency call, the mobile station 20 moves to step 76 in which the call is started and once the call is completed, the mobile station 20 moves to step 78. Because a new emergency call has been placed, the callback timer needs to be restarted, and this is accomplished in step 80.

Once the emergency callback timer is reset, then the system moves back into waiting in an emergency callback mode in step 70.

If the service request in step 74 is found to be a non-emergency call, the system moves to step 82. In step 82 the mobile station determines whether the service request is a non-emergency voice request or a position location request. If it is a non-emergency voice or a position location request, the mobile station 20 moves to step 84 in which it checks whether the service is allowed on the current system. If the mobile station 20 finds in step 84 that the service is allowed on the current system, then the mobile device next moves to step 85 in which it checks whether the service is a non-emergency voice service.

If in step 85 the mobile station finds that the service is a non-emergency voice service, then the call is started in step 86 and once it is over it is ended in step 88 and then moves into step 90 in which the regular mode is entered.

If in step 85 the mobile station finds that the service is not an non-emergency voice service the call is started in step 87 and once it is over is ended in step 89 and the mobile station next moves to step 98 in which checks whether the callback timer has expired.

If in step 84 the mobile station 20 determines that the service is not allowed on the current system then the mobile station 20 moves to step 92 in which it checks whether the user accepts exiting the callback mode on the current system. If in step 92 the user does accept exiting the callback mode, the mobile station moves to step 94 in which a new system is acquired that supports this call request and then back to step 86 in which the call is started, step 88 in which the call is ended, and step 90 in which the regular mode is entered.

If in step 92 the user does not accept exiting the callback mode or if in step 82 it is determined that the service request is not a position location request or a non-emergency voice request then the mobile station moves to step 96. In step 96 the mobile station 20 ignores the request and then moves to step 98 in which it checks whether the callback timer has expired.

If the callback timer has expired in step 98, the mobile device moves into regular mode 90. Otherwise, it moves back to step 70 in which it waits in an emergency callback mode.

Therefore, based on the above, when a user attempts to place a call during the emergency callback mode, the mobile device checks whether it is an emergency call, in which case the call is placed, or a non-emergency voice call or a position location call and whether that is allowed on the current system and, if it is, then the call is placed and the mobile station 20 moves into a regular mode. Otherwise, the mobile device waits until the callback timer is expired before it moves into regular mode.

Figure 4:
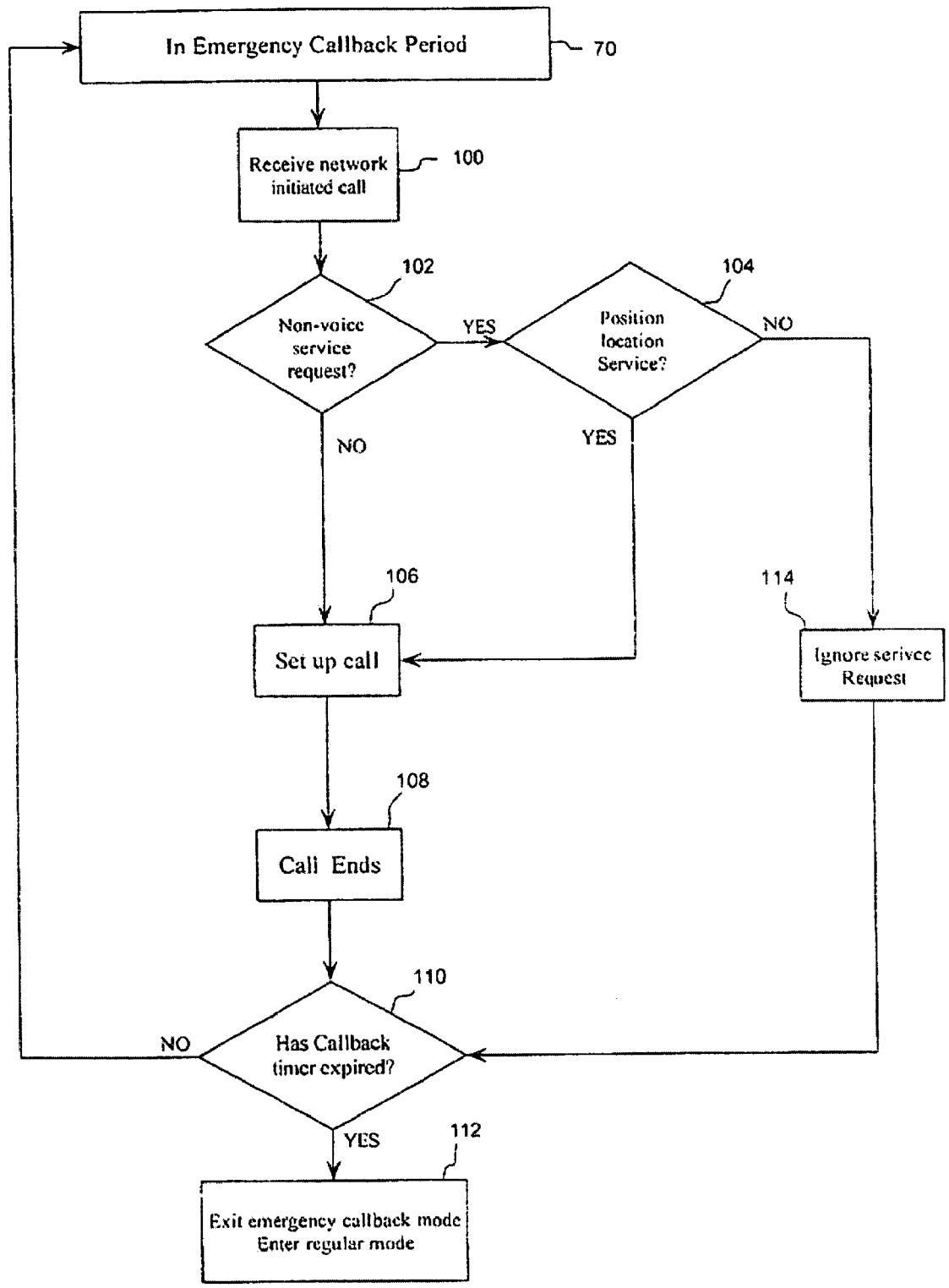
FIG. 4 is a flow chart of network initiated calls during emergency callback mode according to the method of the present invention.

Reference is made to FIG. 4. In FIG. 4, the mobile station 20 is in emergency callback mode 70. In step 100, mobile station 20 receives indication that network wants to initiate a call. The mobile station 20 moves to step 102. In step 102 the mobile station 20 checks whether the network initiated call request is a non-voice service request or a voice service request. If it is a non-voice service request, the mobile station moves to step 104 in which it checks whether the request is a position location service.

If in step 102 the call is found to be a voice service request or if in step 104 the call is found to be a position location service, the mobile station 20 next moves to step 106. In step 106 the call is set up and when finished the mobile station moves to step 108 in which the call is ended.

Mobile station 20 next moves to step 110 in which it checks whether the callback timer has expired. If the callback timer has expired, mobile station 20 moves to step 112 in which the emergency callback mode is ended and the regular mode is entered into.

Conversely, if the callback timer has not yet expired, the system moves to step 70 and stays in emergency callback.

If in step 104 it is found that the non-voice service request is not a position location service the system moves to step 114 in which the service request is ignored, and mobile station 20 next moves back to step 110 in which it checks whether the callback timer is expired.

Figure 5:
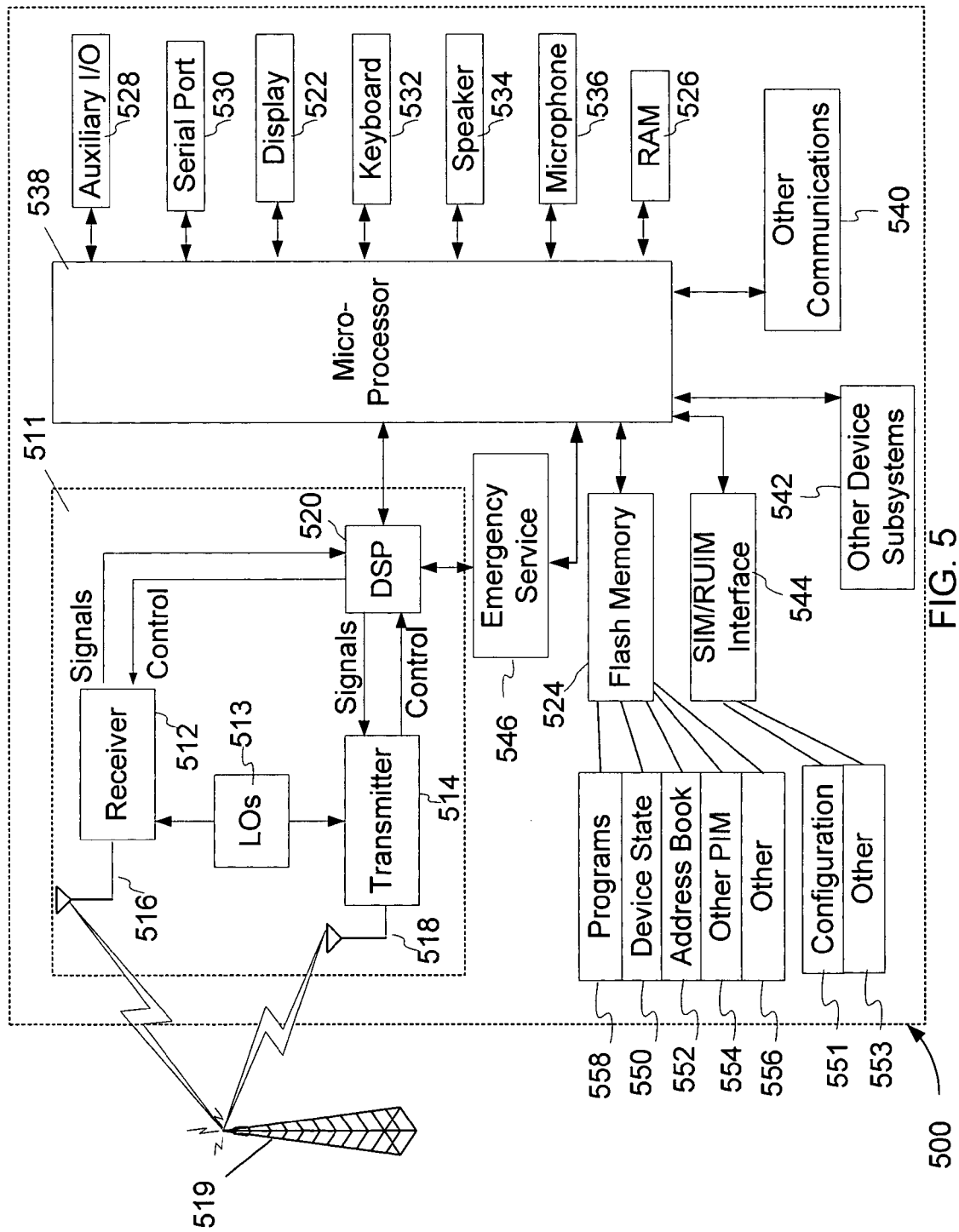
FIG. 5 is a block diagram illustrating a mobile station that can be configured to both act as the MS of FIG. 1 and include preferred embodiments of the apparatus and method of the current application.

Turning now to FIG. 5, FIG. 5 is a block diagram illustrating a mobile station that can be configured to both act as the MS of FIG. 1 and include preferred embodiments of the apparatus and method of the current application. Mobile station 200 is preferably a two-way wireless communication device having at least voice and data communication capabilities. Mobile station 200 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 200 is enabled for two-way communication, it will incorporate a communication subsystem 211, including both a receiver 212 and a transmitter 214, as well as associated components such as one or more, preferably embedded or internal, antenna elements 216 and 218, local oscillators (LOs) 213, and a processing module such as a digital signal processor (DSP) 220. As will be apparent to those skilled in the field of communications, the particular design of the communication subsystem 211 will be dependent upon the communication network in which the device is intended to operate. For example, mobile station 200 may include a communication subsystem 211 designed to operate within the Mobitex™ mobile communication system, the DataTAC™ mobile communication system, GPRS network, UMTS network, EDGE network or CDMA network.

Network access requirements will also vary depending upon the type of network 219. For example, in the Mobitex and DataTAC networks, mobile station 200 is registered on the network using a unique identification number associated with each mobile station. In UMTS and GPRS networks, and in some CDMA networks, however, network access is associated with a subscriber or user of mobile station 200. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as "911" emergency calling, may be available, but mobile station 200 will be unable to carry out any other functions involving communications over the network 200. The SIM/RUIM interface 244 is normally similar to a card-slot into which a SIM/RUIM card can be inserted and ejected like a diskette or PCMCIA card. The SIM/RUIM card can have approximately 64K of memory and hold many key configuration 251, and other information 253 such as identification, and subscriber related information.

When required network registration or activation procedures have been completed, mobile station 200 may send and receive communication signals over the network 219. Signals received by antenna 216 through communication network 219 are input to receiver 212, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 220. In a similar manner, signals to be transmitted are processed, including modulation and encoding for example, by DSP 220 and input to transmitter 214 for digital to analog conversion, frequency up conversion, filtering, amplification and transmission over the communication network 219 via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Mobile station 200 preferably includes a microprocessor 238 which controls the overall operation of the device. Communication functions, including at least data and voice communications, are performed through communication subsystem 211. Microprocessor 238 also interacts with further device subsystems such as the display 222, flash memory 224, random access memory (RAM) 226, auxiliary input/output (I/O) subsystems 228, serial port 230, keyboard 232, speaker 234, microphone 236, a short-range communications subsystem 240 and any other device subsystems generally designated as 242.

Some of the subsystems shown in FIG. 5 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list.

Operating system software used by the microprocessor 238 is preferably stored in a persistent store such as flash memory 224, which may instead be a read-only memory (ROM) or similar storage element (not shown). Those skilled in the art will appreciate that the operating system, specific device applications, or parts thereof, may be temporarily loaded into a volatile memory such as RAM 226. Received communication signals may also be stored in RAM 226.

As shown, flash memory 224 can be segregated into different areas for both computer programs 258 and program data storage 250, 252, 254 and 256. These different storage types indicate that each program can allocate a portion of flash memory 224 for their own data storage requirements. Microprocessor 238, in addition to its operating system functions, preferably enables execution of software applications on the mobile station. A predetermined set of applications that control basic operations, including at least data and voice communication applications for example, will normally be installed on mobile station 200 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 219. In a preferred embodiment, the PIM data items are seamlessly integrated, synchronized and updated, via the wireless network 219, with the mobile station user's corresponding data items stored or associated with a host computer system. Further applications may also be loaded onto the mobile station 200 through the network 219, an auxiliary I/O subsystem 228, serial port 230, short-range communications subsystem 240 or any other suitable subsystem 242, and installed by a user in the RAM 226 or preferably a non-volatile store (not shown) for execution by the microprocessor 238. Such flexibility in application installation increases the functionality of the device and may provide enhanced on-device functions, communication-related functions, or both. For example, secure communication applications may enable electronic commerce functions and other such financial transactions to be performed using the mobile station 200.

In a data communication mode, a received signal such as a text message or web page download will be processed by the communication subsystem 211 and input to the microprocessor 238, which preferably further processes the received signal for output to the display 222, or alternatively to an auxiliary I/O device 228. A user of mobile station 200 may also compose data items such as email messages for example, using the keyboard 232, which is preferably a complete alphanumeric keyboard or telephone-type keypad, in conjunction with the display 222 and possibly an auxiliary I/O device 228. Such composed items may then be transmitted over a communication network through the communication subsystem 211.

For voice communications, overall operation of mobile station 200 is similar, except that received signals would preferably be output to a speaker 234 and signals for transmission would be generated by a microphone 236. Alternative voice or audio I/O subsystems, such as a voice message recording subsystem, may also be implemented on mobile station 200. Although voice or audio signal output is preferably accomplished primarily through the speaker 234, display 222 may also be used to provide an indication of the identity of a calling party, the duration of a voice call, or other voice call related information for example.

Serial port 230 in FIG. 5, would normally be implemented in a personal digital assistant (PDA)-type mobile station for which synchronization with a user's desktop computer (not shown) may be desirable, but is an optional device component. Such a port 230 would enable a user to set preferences through an external device or software application and would extend the capabilities of mobile station 200 by providing for information or software downloads to mobile station 200 other than through a wireless communication network. The alternate download path may for example be used to load an encryption key onto the device through a direct and thus reliable and trusted connection to thereby enable secure device communication.

Other communications subsystems 240, such as a short-range communications subsystem, is a further optional component which may provide for communication between mobile station 200 and different systems or devices, which need not necessarily be similar devices. For example, the subsystem 240 may include an infrared device and associated circuits and components or a Bluetooth™ communication module to provide for communication with similarly enabled systems and devices.

When mobile device 200 is used as the MS 20 of FIG. 1, emergency service module 246 and transceiver 211 cooperate with a method and apparatus for a mobile station to enhance the probability of successful emergency call completion and successful callback from emergency service centre. The emergency service module 246 is shown connected to both microprocessor 238 and DSP 220 of transceiver 211, so that the higher layer concerns can be handled by the microprocessor 238 whereas the lower layers concerns can be handled by the DSP 220.

The above-described embodiments of the present application are intended to be examples only. Those of skill in the art may effect alterations, modifications and variations to the particular embodiments without departing from the scope of the application.

We claim:

1. A method of enhancing the probability of a successful emergency call completion on a mobile station in a network, comprising the steps of:
   during an emergency call attempt by a mobile station, monitoring whether the mobile station has received a non-voice service request from the network and, if yes, ignoring said non-voice service request, said step of ignoring said non-voice service request includes blocking sending of an acknowledgement message generated by the mobile station based on said non-voice service request.

2. The method of claim 1, further comprising the steps of:
   at the start of an emergency call attempt, checking whether the mobile station is already communicating with the network, and if yes, ending the communication with the network.

3. The method of claim 2, further comprising the steps of:
   if said communication with the network is ended, attempting to acquire a network for the emergency call attempt.

4. The method of claim 3, wherein said step of attempting to acquire a network includes periodically attempting to reacquire said network that communication was ended with.

5. The method of claim 1, wherein the mobile station is allowed to acquire any network regardless of whether the network is preferred.

6. The method of claim 5, wherein said mobile station can acquire a network even if a subscriber identity module or a removable user identity module is not present.

7. The method of claim 1, further comprising the steps of:
   sending an emergency call request to the network;
   checking whether the emergency call request was successful;
   if said emergency call request was unsuccessful, checking whether the user aborted the emergency call request; and
   if said user did not abort said emergency call request, attempting to acquire a new system.

8. A method of enhancing the probability of a successful emergency callback to a mobile station in a network from an emergency service centre, the method comprising the steps of:
   during a callback period, monitoring whether the mobile station has received a service request from the network and, if yes,
      ignoring said service request if said service request is a non-voice service request that is anything but a position location service request, said step of ignoring said service request includes blocking sending of an acknowledgement message generated by the mobile station based on said non-voice service request.

9. The method of claim 8, wherein said method further includes the steps of:
   setting up a call for a voice service request or a non-voice position location service request;
   ending said call;
   checking whether a callback timer has expired, and if so entering a regular mode.

10. A mobile station for enhancing the probability of successful emergency call completion to a network and successful callback from emergency service centre, the mobile station comprising:
   a communications subsystem, said communications subsystem including a receiver, a transmitter and a digital signal processor;
   a microprocessor communicating with said digital signal processor of said communications subsystem;
   user input and output means communicating with said microprocessor;
   memory communicating with said microprocessor; and
   an emergency service module, said emergency service module communicating with both said digital signal processor and said microprocessor,
   wherein during an emergency call attempt or callback said emergency service module directs said microprocessor to ignore non-voice service requests other than position location service requests from said network, the ignoring of the non-voice service requests including blocking sending of an acknowledgement message generated by the mobile station based on said non-voice service request.

11. The mobile station of claim 10, wherein said emergency service module further directs said microprocessor to drop existing network communications during said emergency call attempt.

12. The mobile station of claim 11, wherein said emergency service module further directs said microprocessor to block any user initiated, non-position location service requests from a user during a callback period.

13. The mobile station of claim 10, further comprising a subscriber identity module/removable user identity module interface.

14. The mobile station of claim 13, wherein said mobile station can acquire a network during an emergency call attempt without a subscriber identity module or a removable user identity module present in said subscriber identity module/removable user identity module interface.

* * * * *